United States Patent
Kohler et al.

(10) Patent No.: US 7,437,448 B1
(45) Date of Patent: Oct. 14, 2008

(54) METHOD AND DEVICE FOR FUNCTION SELECTION OF A CONTROL UNIT

(75) Inventors: Rolf Kohler, Schwieberdingen (DE); Steffen Gieseler, Oberriexingen (DE); Taskin Ege, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 709 days.

(21) Appl. No.: 09/856,905

(22) PCT Filed: Jun. 27, 2000

(86) PCT No.: PCT/DE00/02090

§ 371 (c)(1),
(2), (4) Date: Sep. 4, 2001

(87) PCT Pub. No.: WO01/23969

PCT Pub. Date: Apr. 5, 2001

(30) Foreign Application Priority Data

Sep. 29, 1999 (DE) ................... 199 46 548

(51) Int. Cl.
*G06F 15/173* (2006.01)
(52) U.S. Cl. .............. 709/224; 709/239; 709/220; 710/38; 710/316; 370/351
(58) Field of Classification Search .......... 709/239, 709/220, 253, 209, 224; 710/38, 316; 370/351, 370/216
See application file for complete search history.

(56) References Cited

U.S. PATENT DOCUMENTS

| 5,105,420 | A | * | 4/1992 | Ardon et al. ............. 370/216 |
| 5,136,585 | A | | 8/1992 | Nizamuddin et al. |
| 6,286,038 | B1 | * | 9/2001 | Reichmeyer et al. ........ 709/220 |
| 6,308,282 | B1 | * | 10/2001 | Huang et al. ............... 370/216 |
| 6,584,093 | B1 | * | 6/2003 | Salama et al. .............. 370/351 |
| 6,788,686 | B1 | * | 9/2004 | Khotimsky et al. ......... 370/394 |

FOREIGN PATENT DOCUMENTS

| DE | 36 24 139 | 1/1988 |
| DE | 39 38 717 | 5/1991 |
| DE | 42 19 669 | 12/1993 |
| DE | 196 21 902 | 12/1997 |
| DE | 197 05 507 | 6/1998 |
| DE | 197 13 153 | 10/1998 |
| EP | 0 293 618 | 12/1988 |
| JP | 61-82204 | 4/1986 |
| JP | 06222403 | 8/1994 |
| JP | 08069303 | 3/1996 |
| JP | 09062315 | 3/1997 |

* cited by examiner

*Primary Examiner*—Philip B Tran
(74) *Attorney, Agent, or Firm*—Kenyon & Kenyon LLP

(57) ABSTRACT

A method and a device for selecting a function which is implemented at a terminal of the device. The device includes a processor and a first function path over which a first function is implemented, and includes at least one other function path over which another function is implemented. The function paths run over at least two different terminals of the processor, and the at least two function paths are connected and are routed directly to the single terminal of the device. The selection of the function to be implemented is made by a predefinable code, and the at least second function is suppressed.

8 Claims, 3 Drawing Sheets

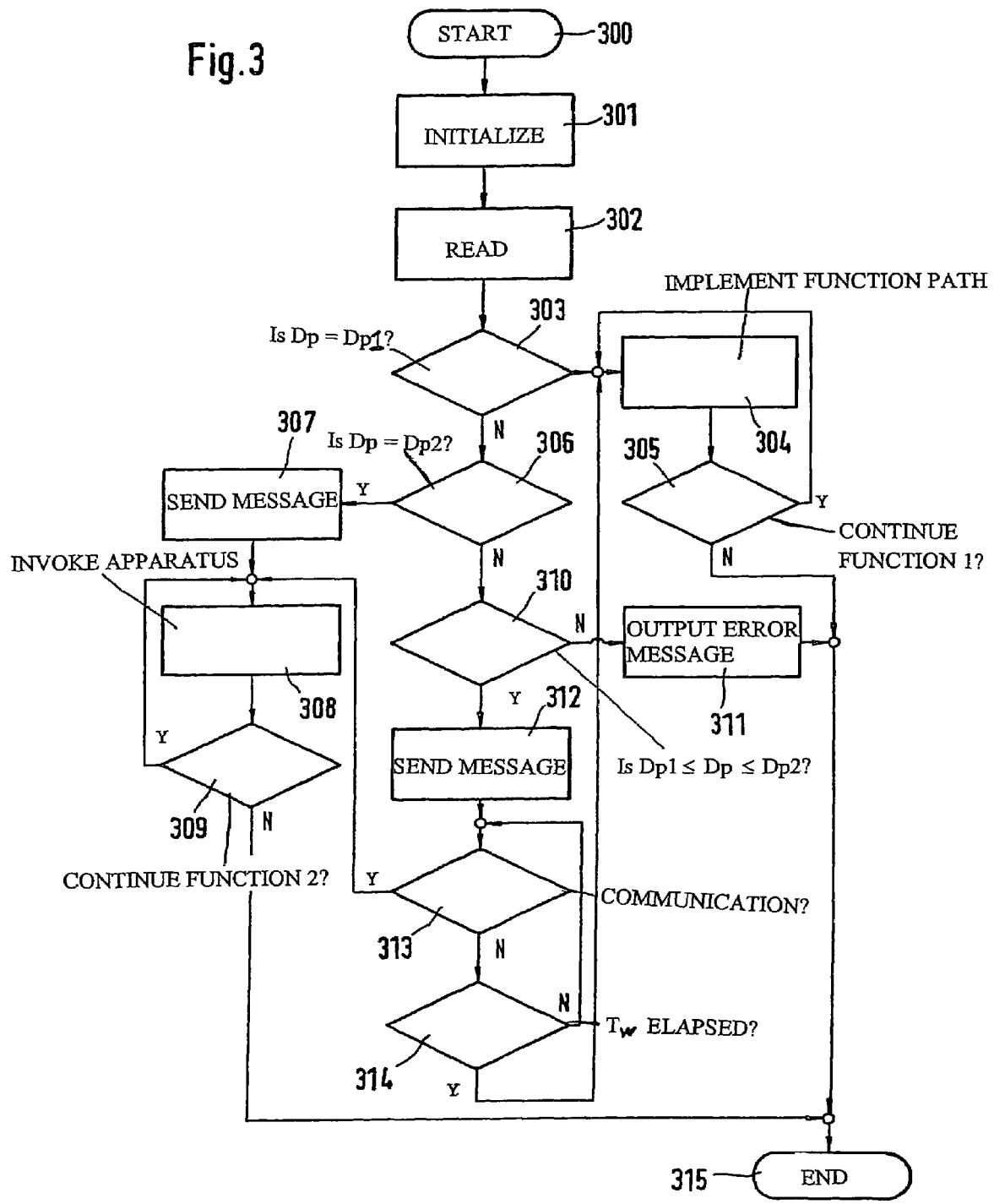

METHOD AND DEVICE FOR FUNCTION SELECTION OF A CONTROL UNIT

FIELD OF THE INVENTION

The present invention relates to a method and a device for selecting at least one function which is implemented at a terminal of a control unit.

BACKGROUND INFORMATION

In German Published Patent Application No. 196 21 902 is discussed a method of multiple allocation of a communication line of a control unit to different signals. An apparent object of this reference is based on a system for superimposing information, a first item of information being represented by an analog signal and a second item of information being in the form of a digital signal. A superposed signal may be formed by superimposing the digital signal on the analog signal. Since the signals are transmitted at the same time, this superimposing of signals may require synchronization. For further processing at the receiving end, this superposed signal may be broken down into the basic signals, i.e., the information analog signal and the digital information signal. It is thus possible to eliminate one input line and the terminals for this line at both ends for a controller. However, this may greatly increase the expense to form the superposed signal, in particular in synchronization, and the downstream separation of the superposed signal in the controller for further processing.

Another method of eliminating terminals on microprocessors is a circuit configuration for operation of a consumer by a microprocessor that is discussed in German Published Patent Application No. 36 24 139. A reversible bidirectional terminal provided on the microprocessor itself is used to switch a consumer as well as to detect an external consumer circuit by a manual switch. Thus, a method of using a single bidirectional input instead of separate inputs and outputs on the microprocessor may be improved such that larger, high-power consumers can be operated and displayed instead of small loads, i.e., low-power consumers. When a manual switch is operated, a potential applied to the bidirectional input of the microprocessor is pulled to ground, indicating that the manual switch has been operated, because the bidirectional input usually has a high resistance due to an internal pull-up resistor. Thus, for this special case, two functions with respect to the same consumer can be implemented at one terminal of a microprocessor. However, since the terminal used is located directly on the microprocessor, a true multifunctionality with regard to different microprocessor outputs and different consumers is not possible.

SUMMARY OF THE INVENTION

It is believed that the foregoing approaches may not, however, yield optimal results in all regards. Thus, an object of an exemplary embodiment and an exemplary method of the present inventions is to achieve a true multifunctionality of a terminal of a control unit or a controller and to improve the methods and devices referred to above.

The exemplary embodiment and method of the present invention are directed to a method and a device for selecting a function which is implemented in a terminal of a control unit, the function to be implemented being selected from at least two different functions. The selection of the function to be implemented is made by a predefinable code, the at least one second function then being suppressed.

The at least two functions can be implemented to advantage by at least two different signals that can be applied to the terminal of the control unit, the signal of the function to be implemented being selected by a code and applied to the terminal, the at least second signal being suppressed at the same time. Through the choice of the code, which may be in a data record that can be applied, which signal is sent via the terminal of the control unit and when it is sent may be predetermined.

Thus, it is believed that it may not be necessary in applications to, for example, to make adjustments in hardware, in particular resetting hardware bridges, or to switch between the functions that are possible on the basis of the microprocessor signals.

A more flexible way of eliminating terminals on the controller and on the wiring harness is provided by the selection of functions or signals by code. In the case of an application or diagnostic procedure, the corresponding lines and terminals can also be eliminated here. A plurality of terminal combinations may be used for different functions, which may also be selected independently of one another.

Since the functions are not implemented by the code at the same time or the signals are not transmitted at the same time, it is believed that an implementation can be accomplished more expediently so that there are no functional restrictions due to the multiple signal allocation.

One of at least two functions from which a selection is made may be the use of the terminal of the control unit as a bidirectional communication connection to another intelligent unit, in particular, another control unit.

Automatic detection of the functionality required in each case may be done in an expedient manner through detection of the respective predetermined code.

In addition, information that can also be predefined with the code regarding a period of time may also be included in the predefinable code in an advantageous manner. This period of time is particularly interpreted as a waiting time after which a switch is made from the function to be implemented to another function which was suppressed during the period of time, in particular when the first function is not carried out correctly. The previously implemented function is then itself suppressed. This provides a simple diagnostic option for switching to a diagnostic function or test function if a malfunction occurs even in the application. The system may also be prevented from being caught in an endless loop when there is a failure in communication in the communication mode, for example, because the system switches to a second function after the waiting time.

A message echo or a signal echo may also be filtered out in an advantageous manner by preselecting a waiting time. In other words, the waiting time until detection of a response signal or an acknowledge signal is selected at least so that no unwanted echo is taken into account, and only the true response is detected and leads to a further reaction under some circumstances.

BRIEF DESCRIPTION OF THE DRAWINGS

FIG. 3 shows a flow chart of the process sequence together with the code and the waiting time for signal selection, where the process may be executed in a microcomputer or in another external control unit.

DETAILED DESCRIPTION

Figure 1:
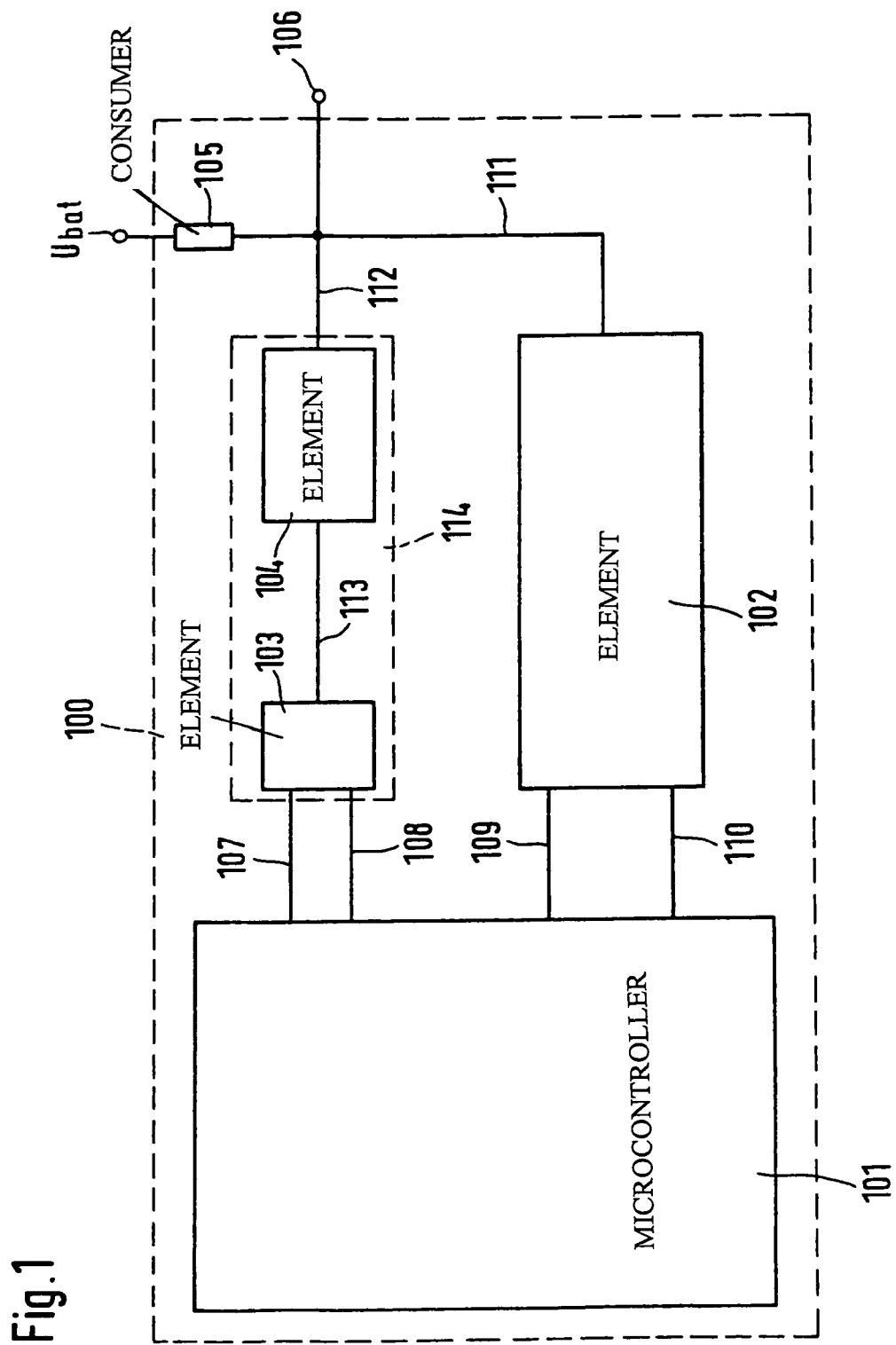
FIG. 1 shows a circuit for the signal switching or function switching of a signal output and use of a communication line.

FIG. 1 shows a schematic circuit diagram in a controller 100 for implementing two functions and/or for selecting from two signal paths at a controller terminal 106. A microcontroller 101 is connected to an element 103 by two lines 107 and 108. Microcontroller 101 is also connected to an element 102 by lines 109 and 110. Element 103 is connected by a line 113 to another element 104. Elements 103 and 104 as well as their connecting line 113 can be combined in one element 114. Elements 114 and 102 which are being discussed here lead over lines 111 and 112 to the same controller terminal 106. Different functions are implemented at controller terminal 106 by elements 102 and 114. In an exemplary embodiment, an output signal of microcontroller 101, e.g., an rpm signal, i.e., an output signal that can be used for the speedometer in the vehicle, is sent over line 108 to element 103. Element 103 is a logic module, such as a gate module, in particular a NAND gate which outputs to line 113 the information of the output signal on line 108 according to the signal on line 107. The signal on line 107 thus functions as a type of release signal for line 108, i.e. its signal.

The signal on line 113 then reaches element 104. In this exemplary embodiment, element 104 is an output stage module. This output stage module for signal output may include, for example, a non-inverting open-drain output stage or an open-collector output stage, depending on the technology and/or implementation. Then the information content of the output signal can be output from line 108 to controller terminal 106 over line 112 through this output stage module 104. This represents a first function due to the analysis of the signal or the display of the signal in an actuator, in particular the aforementioned speedometer. A first function path is thus composed of microcontroller 101, lines 107 and 108, element 114 and line 112 to terminal 106.

Lines 109 and 110 are thus lines for input and output information and input and output signals of microcontroller 101. The signals of unidirectional lines 109 and 110 are then transmitted over a serial data interface 102 to bidirectional line 111. Line 111 can therefore function as a communication line with microcontroller 101 via controller terminal 106; this represents a second function. A second function path is thus composed of microcontroller 101, lines 109 and 110, element 102 and line 111 to terminal 106.

Serial data interface 102 is designed to be non-inverting, for example. Serial data interface 102 also has an output stage module on the bidirectional side so that both elements 114 and 102, which are implementing functions for terminal 106, can be routed jointly to controller terminal 106 over a consumer 105, in particular a resistor, at the power supply voltage, i.e. power supply voltage potential Ubat, as illustrated in FIG. 1. Like output stage module 104, this output stage module may include an open-collector output stage module or an open-drain output stage module, depending on the technology and/or implementation, thus permitting the link shown here.

Using an inversion in element 103 or element 104 (e.g., using the NAND function in element 103), the linking of lines 111 and 112, e.g., as wired AND to controller terminal 106, should guarantee that communication line 111 is cleared for the case when the signal output over lines 107 and 108 of microcontroller 101 is suppressed, i.e., a zero signal is applied. In the case of a suppressed output, i.e., an actual zero signal over line 113, the inversion in 103 yields a one signal. In the case of a subsequent wired AND linking of lines 111 and 112, the information on line 111 is thus output to output 106, i.e., the communication function is ensured.

The outputs of microcontroller 101 and the outputs onto lines 111 and 112 are either active high or active low and the wiring is in positive or negative logic, thus yielding a wired AND or wired OR at terminal 106, for allowing other comparable implementations.

Figure 2:
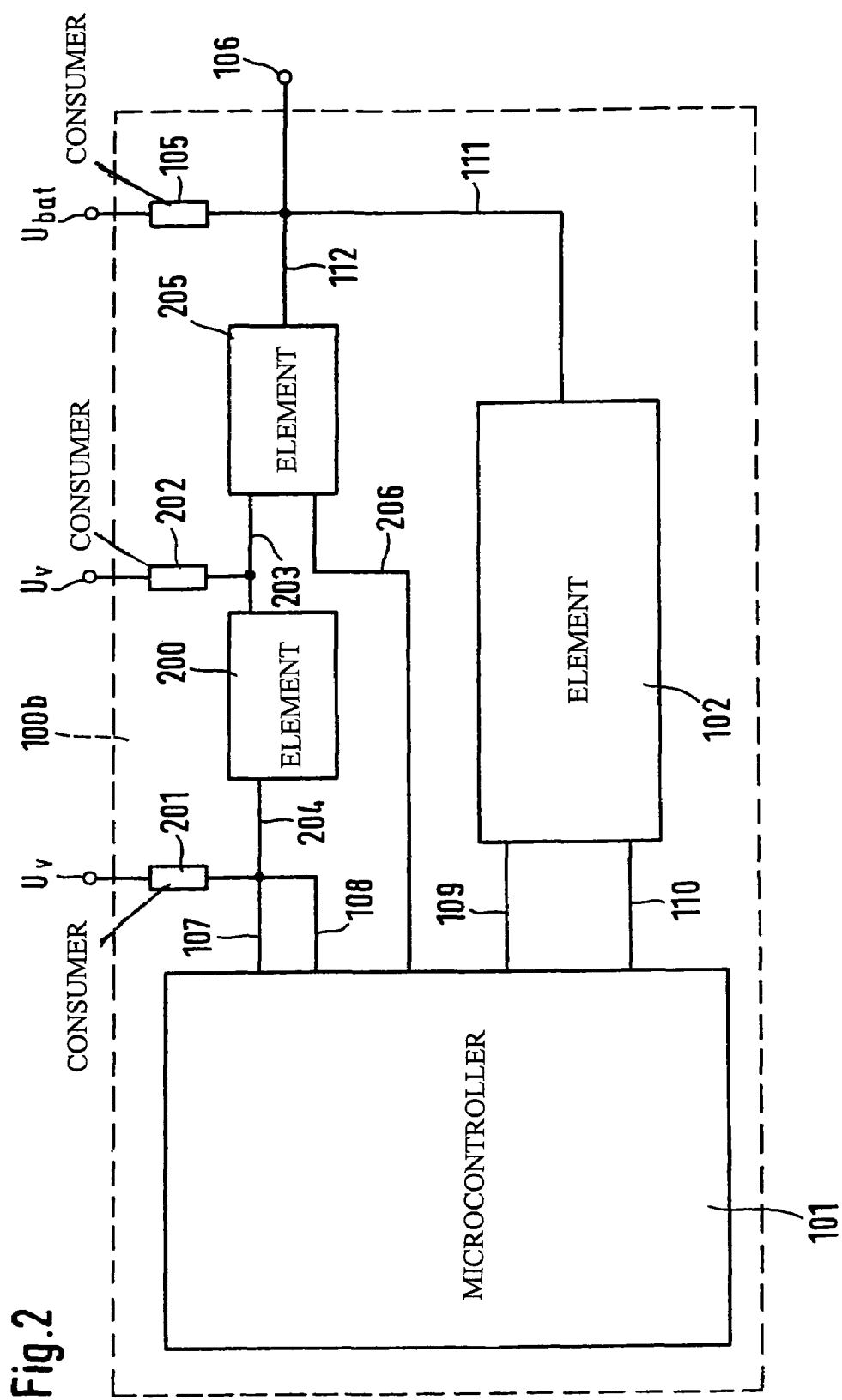
FIG. 2 shows a variant of the circuit having open-drain outputs of the microprocessor.

FIG. 2 shows an exemplary circuit in a controller 100b, which depends in part on the utilization of the module resources in controller 100b. Thus, for example, the NAND function from FIG. 1 may be formed with the help of port configuration options of microcontroller 101 and the inverter functions of other modules. The output on line 107 may thus be configured as an input/output low or as an open-drain output. The output signal on line 108 is sent over an open-drain output on this line, for example. Due to these port configuration options of the outputs for lines 107 and 108, they can be pulled to a power supply voltage UV, which is smaller than Ubat in particular, over a consumer 201, in particular a resistor. Thus, there is an AND link between both signals or lines 107 and 108 to line 204. A downstream inverting low-level signal output stage as part of an existing integrated circuit completes the implementation of the NAND function as intended in FIG. 1. The first function path here is thus composed of microcontroller 101, lines 107 and 108, consumer 201, line 204, element 200, consumer 202, line 203, element 205 together with reset line 206 and line 112 to terminal 106.

Inverting low-level signal output stage 200 may be part of serial data interface 102, for example, and may nevertheless be used by the first function path. For adjusting the level, the signal on line 203 output from inverting low-level signal output stage 200 is also connected to the power supply voltage over consumer 202. An output stage module 205 is connected to line 203, comparable to element 104 in FIG. 1, and may also be designed as a non-inverting open-drain output stage. In addition to the signal on line 203, which contains the rpm information, etc., a reset signal is also sent to output stage module 205 over line 206. This signal is sent from the reset circuit of the microcontroller core to output stage module 205.

The reset signal should ensure that output stage module 205 will not supply an active low signal when the processor is inactive. This should ensure that module 205 will not seize terminal 106 when the processor is inactive.

The output signal from output stage module 205 then goes again to line 112. Function path 2 starts from the serial data interface of microcontroller 101 over output line 109 and input line 110, as described for FIG. 1. Serial data interface 102, which may be non-inverting and have an open-drain output stage module, may also be part of a multifunction IC installed in the controller. Thus, the module, i.e. the integrated circuit, may also contain a voltage stabilizer having reset signal generation. Thus, these parts, i.e., serial data interface 102 and inverting low-level signal output stage 200 are linked to the reset signal, even if they are in the same module. The outputs of the integrated circuit, i.e. the multifunction module, optionally containing elements 200 and 102, then have a high resistance in reset mode.

The module outputs, i.e., lines 112 and 111 or the signals then on these lines, are then pulled again to the voltage or potential Ubat over consumer 105 and are thus linked to terminal 106 of the controller. Thus, here as in FIG. 1, the two functions, i.e. the respective signals, are sent separately to microcontroller 101. They are linked only on the downstream hardware as described previously. The unwanted function, i.e. the respective signal, is suppressed by the software by switching it to a passive mode.

The signal on line 204 or line 204 itself becomes passive when a zero or low is output on line 108 (switching from input to output active low). Line 108 is necessary when the signal on line 107 cannot be switched off by processor 101.

The signal on line 109 becomes passive when it is held fixedly at one or high. In the case of the communication function, this corresponds to switching from serial output to static port active high.

FIG. 3 shows a process sequence for function switching by using a code, so that hardware signals are defined by the software. This process can take place in controller 100 or 100b itself or it may be carried out completely or in part by another control unit, which is connected over terminal 106, e.g., an application device. The start of a run through the process takes place in block 300. This may be initiated externally or internally. In block 301, the code or pin datum Dp is input or initialized. This may take place in an applicable data record, for example. This input of the pin datum may take place individually or in the form of a reset-controlled or time-controlled table having a plurality of successive pin data. In the program run, depending on pin datum Dp, i.e., through the software, which function is or will be implemented on terminal 106 may be specified.

In block 302 the code is read in the form of pin datum Dp. Then in downstream query 303, a check is performed to determine whether pin datum Dp corresponds to a stored reference code Dp1. If this is the case, the system goes to block 304 where function 1, i.e., the function path, is implemented with block 114. For example, the aforementioned output signal, i.e., a signal 1, is output to pin 106 here. In this case, the output signal on line 108 is cleared by the release signal on line 107 and the function of communication line 111 is suppressed by switching data lines 109 and 110 to a passive mode.

Then a time-controlled check is performed in query 305, in particular after a predefinable period of time has elapsed, to determine whether function 1, specifically the signal output here, is to be continued. Test criteria for query 305 may include, for example, an end acknowledgment in the signal path, a timing sequence of a timing element or a demand request for function 2. Likewise, any reset may also be considered a termination condition for the signal output.

In the case of the desired termination of function 1, the process goes to block 315, the end of the run. In the other case, function 1 is carried out further. If the code read out does not correspond to Dp1, the process goes to query 306 where a check is performed to determine whether the pin datum, i.e., code Dp, corresponds to another predefinable code Dp2. If this is the case, the process goes to block 307.

Since function 2 provides the use of terminal 106 as a communication connection in this specific embodiment, a message is sent in block 307 to wake up or invoke the measuring apparatus, arrangement or structure, or the application apparatus, arrangement or structure in the form of a certain protocol, for example. This wake-up signal in block 307 leads to block 308.

Using function 2, the use of terminal 106 or line 111 provides a bidirectional communication connection here, signals 2 belonging to function 2 being transmitted over controller terminal 106 in particular. Controller 100 or 100b is then ready to receive a message over communication line 111 in particular.

Then a check is performed in downstream block 309 to determine whether or not function 2 is to be continued. Here again, this check can take place via an end acknowledgment over communication line 111, a predefinable timing sequence or a possible demand request for function 1. If function 2 is to be continued, the process goes back to block 308. In the other case, it goes to block 315, the end of the run.

If the code read out in query 306 does not correspond to predefinable code Dp2, the process goes to query 310, where a check is performed to determine whether code Dp is between codes Dp1 and Dp2 mentioned above. If a length of 8 bits, i.e., one byte, is selected for code Dp, then Dp1 would correspond to 0, for example, and Dp2 would be 255. Thus, the steps in between, i.e., 1 through 254, would be checked in query 310. If code Dp does not correspond to a value between Dp1 and Dp2, then an error message that no valid pin datum had been entered, for example, is output in block 311. Likewise, a reset initiation would also be conceivable in block 311. From block 311, the system goes again to the end of the run in block 315. However, query 310 is optional inasmuch as there is no other option here due to the allocation of codes Dp1 and Dp2 and the representation of Dp of 8 bit here to the representation of 0 to 255, so pin datum Dp is invalid.

In addition, codes with special meanings may also be assigned. For example, Dp1 may be assigned the special meaning that a switch is made to function 1 immediately and irreversibly (except by reset) in the case of Dp1. Likewise, Dp2 may be assigned the special meaning that there is never a switch to function 1 in the case of Dp2, waiting time Tw being allocated more or less infinitely.

If a value between Dp1 and Dp2 is selected for the code, the process goes to block 312, where a wake-up signal as in block 307, e.g., in the form of a special protocol, is sent to the measuring apparatus, arrangement or structure or application apparatus, arrangement or structure or other controllers which are connected at terminal 106. At the same time, a waiting time Tw during which communication line 111 is kept activated, can be predefined here through the code. A possible stipulation for waiting time Tw is, for example, multiplication of code value Dp, i.e., 1 through 254 here, by a predefinable time unit value twn which may be 100 ms, for example. Thus for this specific case, programmable waiting time Tw varies between 100 ms and 25.4 sec. Programmable waiting time Tw ensures that, for example, an echo of the wake-up signal or wake-up protocol is not misinterpreted as establishing communication, because a signal input is registered as communication only following the possible echo occurrence time. In the case of a connection of an application device to terminal 106, it is appropriate to set waiting time Tw so that the application device can still make an acknowledgment before a waiting time Tw that is too short has elapsed. If the application device needs half a second to one second, for example, until it begins to send again after an interruption, e.g., a reset, it is appropriate in this case to set waiting times longer than one second. A very flexible adaptation to a variety of different application devices is thus possible.

Query 313 checks to determine whether communication with a measuring means or the application means has come about on communication line 111 over pin 106. If this is the case, the system goes to block 308, for execution of function 2 as described above. If no communication takes place, query 314 checks whether programmable waiting time Tw has elapsed. If this is the case, it goes to block 304, for example, where function 1 is carried out. As an alternative, it could also go to block 315 at the end of the run. If the waiting time has not yet elapsed, a check is also performed in query 313 to determine whether the desired communication has taken place. This check can take place, for example, on the basis of the input of acknowledgment information as a reaction to the wake-up signal or the wake-up protocol message. In general, in the exemplary embodiment of function 2 as a communication line, communication line 111 is active for the codes leading to function 2 after each reset and function 1 is suppressed. Thus, if there has not been any communication with a measuring apparatus, arrangement or structure on communication line 111 within the waiting time, communication line 111 is deactivated for this operating cycle, and the output of signal 1, i.e., function 1, is activated. The respective operating cycles (see queries 305 and 309) end, for example, with a demand request of the respective function or specifically by switching on or other reset.

What is claimed is:

1. A method for selecting a function to be implemented at a terminal of a control unit, the method comprising the steps of:

selecting the function to be implemented from one of at least two different functions by using a predefinable code for providing an implemented function; and suppressing other ones of the at least two different functions, wherein the predefinable code includes information pertaining to a waiting time corresponding to a period of time after which a switch is made from the function to be implemented to a further function of the at least two different functions, the further function being suppressed during the period of time;

wherein suppressing the at least two different functions is done without resetting any hardware arrangement.

2. The method according to claim 1, wherein the at least two functions are implemented by at least two different signals applicable to the terminal of the control unit, one signal of the at least two different signals of the function to be implemented is selected by the predefinable code and applied to the terminal, and other ones of the at least two different signals are suppressed.

3. The method according to claim 1, wherein one function of the at least two functions is implemented by a signal applicable to the terminal of the control unit, the signal of the function to be implemented is selected by the predefinable code and applied to the terminal, and other ones of the at least two different functions are suppressed.

4. The method according to claim 1, wherein one of the at least two functions includes a use of the terminal of the control unit for providing a bidirectional communication connection of another control unit to the control unit.

5. A device for selecting a function to be implemented at a terminal, the device comprising:

a processor;

a first function path for implementing a first function; and at least another function path for implementing at least another function;

wherein the first function path and the at least another function path run over at least two other different terminals of the processor, the first function path and the at least another function path being connected and being routed directly to the terminal, wherein:

the first function is selected for implementation by using a predefinable code for providing an implemented function, and the predefinable code includes information pertaining to a waiting time corresponding to a period of time after which a switch is made from the first function to be implemented to the other function, the other function being suppressed during the period of time;

wherein the other function is suppressed without resetting any hardware arrangement.

6. The device according to claim 5, further comprising an arrangement for selecting and clearing a function path of a function to be implemented independently of the predefinable code and for suppressing the at least another function path.

7. The device according to claim 5, wherein the first function includes a signal output unidirectionally over the first function path.

8. The device according to claim 5, wherein the at least another function includes communicating bidirectionally with a computer unit over the at least another function path.

* * * * *